(12) United States Patent
Kobayashi

(10) Patent No.: US 6,792,090 B1
(45) Date of Patent: Sep. 14, 2004

(54) TELEPHONE DIRECTORY ADDRESS STORING METHOD AND INFORMATION TERMINAL HAVING TELEPHONE FUNCTION AS WELL AS STORAGE MEDIUM ON WHICH PROGRAM THEREFOR IS RECORDED

(75) Inventor: Yosikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/392,619

(22) Filed: Sep. 9, 1999

(30) Foreign Application Priority Data

Sep. 9, 1998 (JP) .......................................... 10-255814

(51) Int. Cl.⁷ ...................... H04M 1/56; H04M 15/06; H04M 3/00
(52) U.S. Cl. ...................... 379/142.17; 379/142.01; 379/142.15; 379/201.04; 379/245; 379/247
(58) Field of Search ....................... 379/142.01, 142.04, 379/142.06, 142.13, 142.15, 142.17, 201.02, 201.04, 218.01, 245, 247; 709/328, 329; 700/17, 214; 345/619, 1.2

(56) References Cited

U.S. PATENT DOCUMENTS

| | | | | |
|---|---|---|---|---|
| 5,754,636 A | * | 5/1998 | Bayless et al. | 379/142.1 |
| 5,850,433 A | * | 12/1998 | Rondeau | 379/201.01 |
| 5,943,055 A | * | 8/1999 | Sylvan | 345/349 |
| 6,064,725 A | * | 5/2000 | Nakanishi | 379/140 |
| 6,084,951 A | * | 7/2000 | Smith et al. | 379/93.17 |
| 6,223,057 B1 | * | 4/2001 | Sone | 455/564 |
| 6,285,364 B1 | * | 9/2001 | Giordano, III et al. | 345/347 |
| 6,396,849 B1 | * | 5/2002 | Sarkissian et al. | 370/490 |

FOREIGN PATENT DOCUMENTS

| | | |
|---|---|---|
| JP | 6-303302 | 10/1994 |
| JP | 9-55815 | 2/1997 |
| JP | 10-155038 | 6/1998 |
| JP | 11-215221 | 8/1999 |

* cited by examiner

*Primary Examiner*—Quoc Tran
(74) *Attorney, Agent, or Firm*—Sughrue Mion, PLLC

(57) ABSTRACT

A telephone directory address storing method and an information terminal by which telephone directory information is efficiently managed to achieve augmentation of the operability. The information terminal includes a display section, a storage section, an inputting section, a circuit interface section, and a control section for controlling the entire information terminal. The control section has a function of drawing a window delineated by closed line segments on the display section. The display section draws a first window displayed most forwardly with respect to any other window, fetches a character train selected on a second window into the first window through the storage section, waits a call origination instruction from the inputting section in the first window, dials in response to a call origination instruction from the inputting section through the circuit interface section, and simultaneously stores the character train selected on the second window into a telephone directory address storage section.

46 Claims, 16 Drawing Sheets

US 6,792,090 B1

TELEPHONE DIRECTORY ADDRESS STORING METHOD AND INFORMATION TERMINAL HAVING TELEPHONE FUNCTION AS WELL AS STORAGE MEDIUM ON WHICH PROGRAM THEREFOR IS RECORDED

BACKGROUND OF THE INVENTION

1. Field of the Invention

The present invention relates to an information terminal apparatus which can originate a telephone call to a telephone circuit, and more particularly to a method which provides a simplified telephone number operation for an information terminal apparatus having an operation system (hereinafter referred to simply as OS) for displaying a window screen.

2. Description of the Related Art

An OS by which display data processed by a plurality of programs are displayed on windows (for example, the Windows 95 of Microsoft) is conventionally available. An information terminal such as a computer in which such an OS as just described is installed is connected to a circuit by means of a modem having a circuit interface with a telephone circuit in order to originate a telephone call, and can display a window by the OS and effect telephone communication.

Also an information terminal having such a telephone call origination function as just described has been proposed wherein character information including a telephone number displayed on a window screen (second window) for a word processor document or the like displayed as a result execution of a controlling OS is extracted and only the number is taken out from within the character information and displayed in a telephone call originating window (first window) under the control of a telephoning OS and then a telephone call is originated to a telephone circuit based on the displayed number. The information terminal saves a time for inputting the telephone number and allows a telephone call to be originated simply and rapidly.

FIG. 15 shows the information terminal just described. Referring to FIG. 15, the information terminal includes a circuit interface 1 connected a telephone circuit L, a control circuit 2 for controlling the entire information terminal, a mouse 3, a keyboard 4, a display memory 5 and a display unit 6 all connected to the control circuit 2, and a telephone set 12 connected to the circuit interface 1.

The control circuit 2 includes a controlling OS execution circuit 7 for executing a basic OS for causing a window to be displayed and a controlling OS which is initiated under the basic OS and includes, for example, a word processor OS, a telephoning OS execution circuit 8 for executing a telephoning OS, and input/output interfaces (I/O) 9, 10 and 11 connected to the mouse 3, keyboard 4 and display memory 5, respectively.

The telephoning OS of the telephoning OS execution circuit 8 allows a telephone call to be originated to a telephone circuit through the controlling OS of the controlling OS execution circuit 7. In particular, the telephoning OS execution circuit 8 controls a display application of the controlling OS execution circuit 7 to cause the display unit 6 to display such a telephone call originating window (first window) 111 as shown in FIG. 16 through the display memory 5.

Further, the telephoning OS execution circuit 8 extracts character information 113 for telephone call origination from within an arbitrary window display screen (second window) 112 in response to an operation of the mouse 3 or the keyboard 4, extracts only numeral information from within the character information and displays the numeral information as telephone number information on the telephone call originating window 111.

Finally, when the telephone number of a display portion 116 in the telephone call originating window 111 designates an extension line, an extension button 117 is clicked, but when the telephone number designates a line wire, a line wire button 118 is clicked, by means of the mouse 3. Consequently, the circuit interface 1 is controlled so that it may originate a telephone call to the telephone circuit L based on the number displayed on the display portion 116.

In this manner, arbitrary telephone number information displayed in a window of a word processor document or some other window screen displayed as a result of execution of the controlling OS can be extracted by a simple operation and a telephone call can be originated automatically.

With the information terminal described above, a time required to cause a telephone key screen to be displayed on the display unit 6 and input a telephone number is saved and a telephone call can be originated simply and rapidly. However, when a character train is clicked for dialing, information of an address, a name, a post and so forth included in the clicked character train is abandoned after the dialing, and in order to originate a telephone call to the same designation again, the same character train must be clicked again. Similarly, when, upon reception, a relating character train is displayed and the displayed information is clicked, even if information of an address, a post and so forth is included in the information, the information is abandoned.

Further, also with apparatus which use the OS of the Windows CE of Microsoft published as the most novel type, no screen link for receiving dial information is available, and a screen on which a telephone number is dialed upon telephone call origination remains within linking in an application such as a scheduler or a business card management application. Therefore, a telephone number must be described in and controlled as a telephone directory address in the application.

It is a further problem that general purpose telephone directory information and a telephone call origination-termination history are not linked except a database for exclusive use for a call center.

SUMMARY OF THE INVENTION

It is an object of the present invention to provide a telephone directory address storing method and an information terminal having a telephone function which achieves further augmentation of the operability.

In order to attain the object described above, according to the present invention, a character train clicked for dialing is made the most of to efficiently manage telephone directory information of an information terminal apparatus.

In particular, according to a first aspect of the present invention, there is provided a telephone directory address storing method by an information terminal which has an operation system by which a plurality of window screens can be displayed on a display unit and is provided with a telephone function, comprising the steps of selecting character information on a window screen initiated by the operating system and storing the selected character information, and extracting a telephone number from within the selected and stored character information, originating a telephone call to a telephone circuit based on the extracted telephone number and transferring and storing all of the selected character information to and into a telephone directory address storage section.

According to another aspect of the present invention, there is provided a telephone directory address storing method by an information terminal which has an operation system by which a plurality of window screens can be displayed on a display unit and is provided with a telephone function, comprising the steps of displaying a first window for controlling origination of a telephone call, selecting character information on a second window initiated by the operating system and displayed separately from the first window and storing the selected character information, and extracting a telephone number from within the stored character information and displaying the telephone number on the first window, originating a telephone call to a telephone circuit based on the telephone number displayed on the first window, and transferring and storing all of the selected character information to and into a telephone directory address storage section.

According to a yet further aspect of the present invention, there is provided an information terminal having a telephone function and having an operation system which allows a plurality of window screens to be displayed on a display unit, comprising character information selection means for selecting character information displayed on a window screen initiated by the operating system, storage means for storing the character information selected by the character information selection means, means for extracting a telephone number from within the character information stored in the storage means, means for outputting the telephone number extracted by the means for extracting a telephone number in order to originate a telephone call to a telephone circuit, and telephone directory address storage means for storing the character information stored in the storage means as address information.

According to a still further aspect of the present invention, there is provided an information terminal having a telephone function and having an operation system which allows a plurality of window screens to be displayed on a display unit, comprising means for displaying a first window for controlling origination of a telephone call, means initiated by the operating system for displaying a second window, character information selection means for selecting character information displayed on the second window screen, storage means for storing the character information selected by the character information selection means, means for extracting a telephone number from within the character information stored in the storage means and displaying the telephone number on the first window, means for outputting the telephone number displayed on the first window in order to originate a telephone call to a telephone circuit, and telephone directory address storage means for storing the character information stored in the storage means as address information. The information terminal may further comprise means for displaying reception information on the second window, character information selection means for selecting character information from within the reception information displayed on the second window screen, storage means for storing the character information selected by the character information selection means, and telephone directory address storage means for storing the character information stored in the storage means as address information.

Each of the information terminals may further comprise means for reading out the character information stored in the telephone directory address storage means, extracting a telephone number from within the read out character information, and originating a telephone call to a circuit based on the extracted telephone number.

The telephone directory address storage means may be sectioned into more than one item column, and include item comparison memory means for extracting character information corresponding to each of the items from within the selected character information and transferring and storing the character information to and into the pertaining item column.

The item comparison memory means may store characters relating to the items, and compare, when a character train other than a numeral is included in the character information selected by the character information selection means, the character information with the characters stored in the item comparison memory means and store, when coincident characters are detected in the character train, the character train into the pertaining item column of the telephone directory address storage means.

The item comparison memory means may include an address comparison memory section and compare, when a character train other than a numeral is included in the character train fetched from the second window, the character train with predetermined characters registered in the address comparison memory section, and then store, when coincident characters are detected in the character train, the character train into an address column of the telephone directory address storage section.

As an alternative, the item comparison memory means may include a name comparison memory section and compare, when a character train other than a numeral is included in the character train fetched from the second window, the character train with predetermined characters registered in the name comparison memory section, and then store, when coincident characters are detected in the character train, the character train into a name column of the telephone directory address storage section.

As another alternative, the item comparison memory means may include a post comparison memory section and compare, when a character train other than a numeral is included in the character train fetched from the second window, the character train with predetermined characters registered in the post comparison memory section, and then store, when coincident characters are detected in the character train, the character train into a post column of the telephone directory address storage section.

As a further alternative, the item comparison memory means may include a mail comparison memory section and compare, when a character train other than a numeral is included in the character train fetched from the second window, the character train with predetermined characters registered in the mail comparison memory section, and then store, when coincident characters are detected in the character train, the character train into a mail column of the telephone directory address storage section.

As a still further alternative, the item comparison memory means may include a FAX comparison memory section and compare, when a character train other than a numeral is included in the character train fetched from the second window, the character train with predetermined characters registered in the FAX comparison memory section, and then store, when coincident characters are detected in the character train, the character train into a FAX column of the telephone directory address storage section.

As a yet further alternative, the item comparison memory means may include a division comparison memory section and compare, when a character train other than a numeral is included in the character train fetched from the second window, the character train with predetermined characters registered in the division comparison memory section, and then store, when coincident characters are detected in the character train, the character train into a division column of the telephone directory address storage section.

As a yet further alternative, the item comparison memory means may include a company name comparison memory section and compare, when a character train other than a numeral is included in the character train fetched from the second window, the character train with predetermined characters registered in the company name comparison memory section, and then store, when coincident characters are detected in the character train, the character train into a company name column of the telephone directory address storage section.

Each of the information terminals may further comprise means for storing, when a telephone call to the telephone circuit is originated, a call origination history into a history column of the telephone directory address storage section.

Each of the information terminals may further comprise means for inputting characters from an operation section to store the call origination history into a history column of the telephone directory address storage section.

According to a yet further aspect of the present invention, there is provided a storage medium on which a program is stored for causing a computer to execute the steps of displaying a first window for controlling origination of a telephone call, selecting character information on a second window different from the first window and storing the selected character information, extracting a telephone number from within the stored character information and displaying the telephone number on the first window, originating a telephone call to a telephone circuit based on the telephone number displayed on the first window, and transferring and storing the selected character information to and into a telephone directory address storage section.

With the telephone directory address storing methods and information terminals, only by designating a display on a a screen, a telephone call can be originated, and each time a call origination operation is repeated, company name, category, post, mail, FAX or the like of the other party is automatically stored into the telephone directory address storage section. Consequently, there is an advantage that the contents of the telephone directory are automatically grown.

Further, each time a caller ID such as a telephone number, company name, address or FAX column is acquired from the last description of a mail or the like or from a column of enquiry of a Web, an address, full name, company name, category, post, mail, FAX or the like of the other party is automatically stored into the telephone directory address storage section. Consequently, there is an advantage that the contents of the telephone directory are automatically grown. Furthermore, only by simultaneously designating the caller ID upon dialing, a telephone call can be originated.

Besides, since dialing can be performed based on an address stored in the telephone directory address storage section, a telephone call origination operation can be performed simply and conveniently, and augmentation of the transmission efficiency can be achieved.

Further, since the means is provided for storing, when a telephone call origination operation is performed, the telephone call origination history into the history column of the telephone directory address storage section, there is an advantage that, only by repeating a telephone call origination operation, a client corresponding history is left in the telephone directory. Further, the telephone call origination history may be stored into the contents of the history column of the telephone directory address storage section by inputting characters from the operation section.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
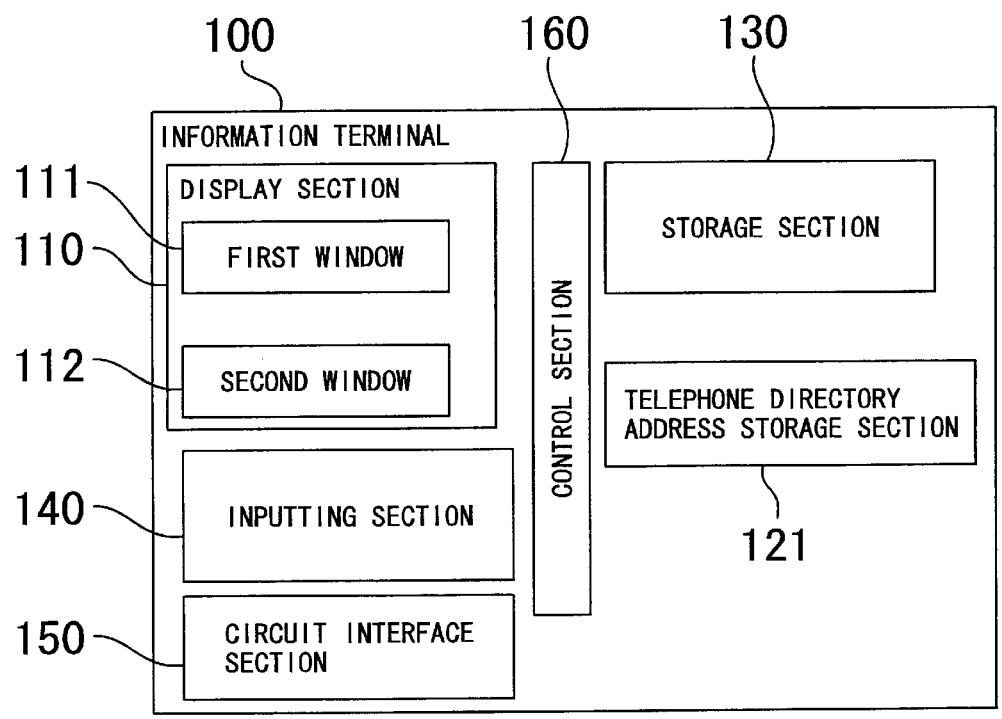
FIG. 1 is a block diagram of an information terminal to which the present invention is applied.

Referring first to FIG. 1, there is shown an information terminal to which the present invention is applied. The information terminal shown is generally denoted at 100 and represented by an electronic notebook or a personal computer. The information terminal 100 includes a display section 110, a storage section 130, an inputting section 140, a circuit interface section 150 and a control section 160 for controlling the entire information terminal. The control section 160 specifically provides a function of drawing a window delineated by closed line segments on the display section 110. The display section 110 thus draws a first window 111 displayed more forwardly than any other window or on a tool bar, fetches a character train selected on a second window 112, which is one of the other windows, through the storage section 130 into the first window 111, waits for a telephone call origination instruction from the inputting section 140 in the first window 111, dials through the circuit interface section 150 in response to a telephone call origination instruction from the inputting section 140 and stores the character train selected on the window display screen 112 into a telephone directory address storage section 121.

Further, the display section 110 displays caller ID information acquired from the circuit interface section 150 in the first window 111 and stores the caller ID into the telephone directory address storage section 121 in response to an instruction from the inputting section 140.

Figure 2:
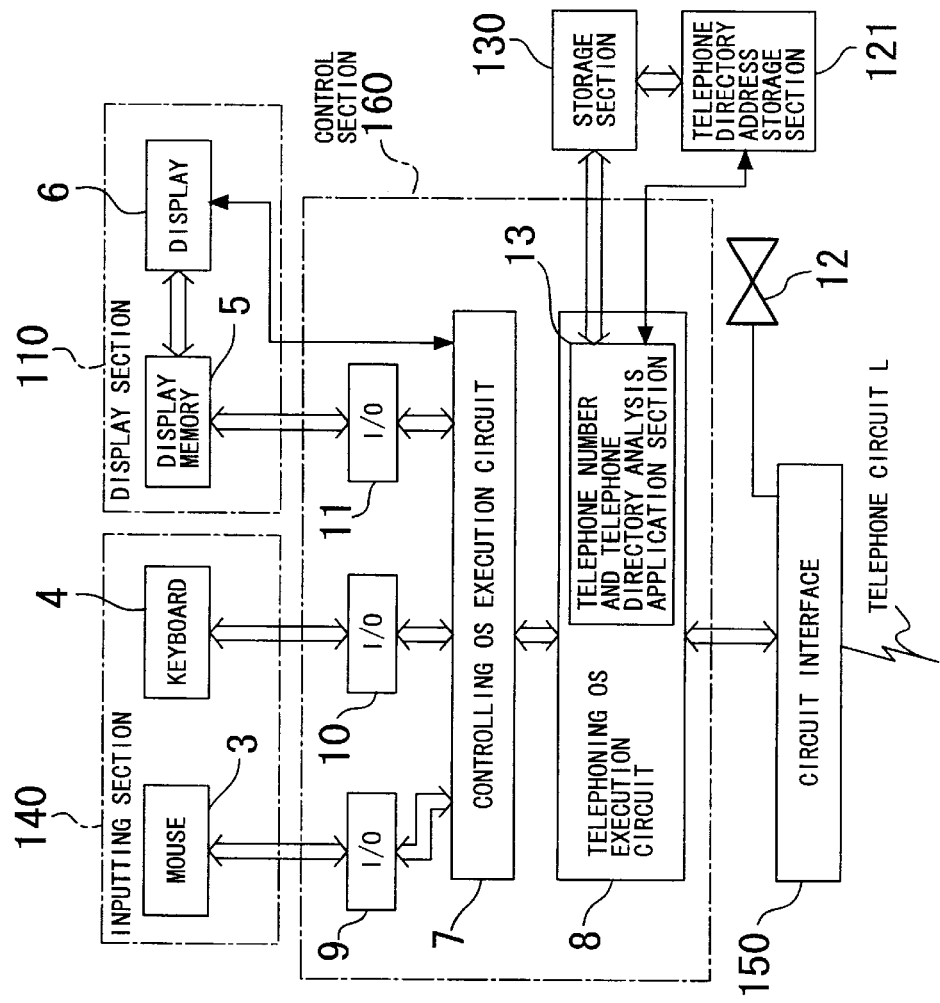
FIG. 2 is a view showing connections among a control circuit, a telephone directory address storage section and peripheral circuits of the information terminal of FIG. 1.

Referring now to FIG. 2 which show connections among the control section 160, telephone directory address storage section 121 and associated circuits of the information terminal of FIG. 1, the control section 160 includes a telephoning OS execution circuit 8 which in turn includes a telephone number and telephone directory analysis application section 13 for transmitting and receiving instructions and information to and from the telephone directory address storage section 121 through the storage section 130. It is to be noted that, while the telephoning OS execution circuit 8 includes a plurality of application sections not shown in addition to the telephone number and telephone directory analysis application section 13, description of them is omitted here because they have no particular relationship to the present invention.

Figure 3:
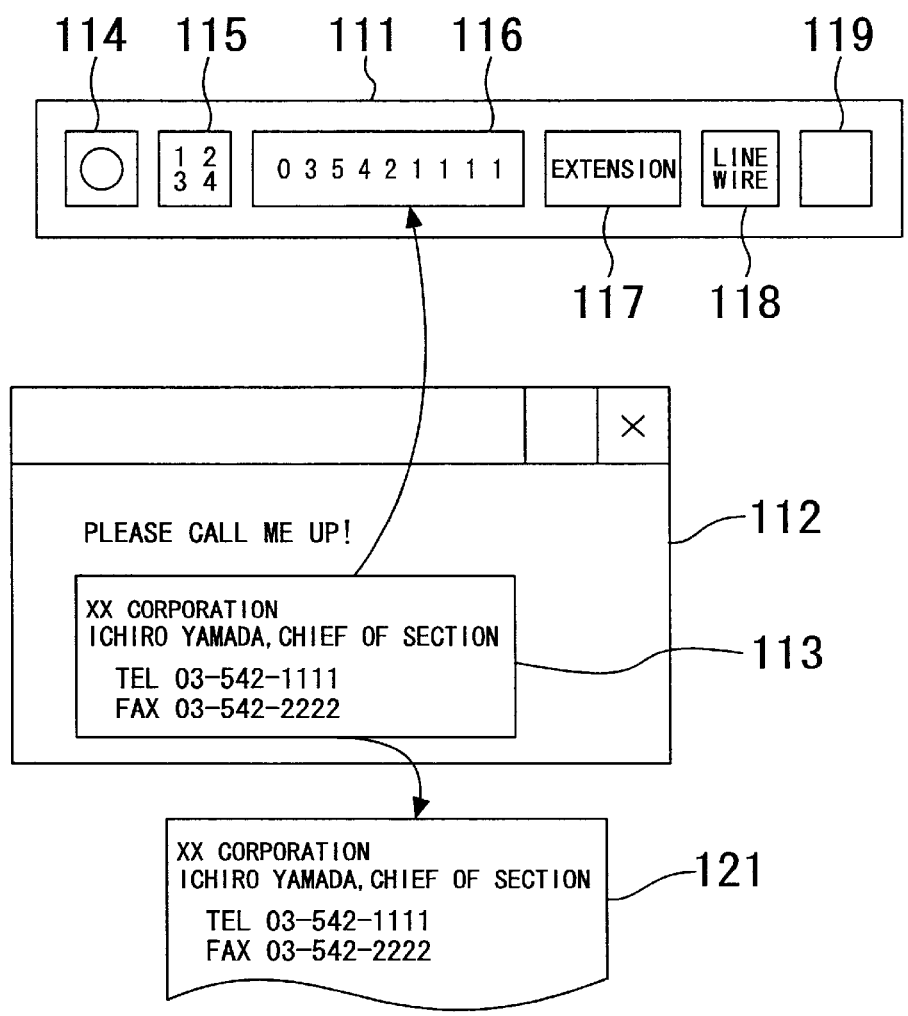
FIG. 3 is a diagrammatic view illustrating an example of operation of the information terminal of FIG. 1.

Referring to FIG. 3, the telephone number and telephone directory analysis application section 13 extracts a telephone number from within character information 113 clicked by means of a mouse or the like from within information stored in a common work area of a controlling OS execution circuit 7, dials the telephone number through the circuit interface section 150 in response to a telephone call origination instruction from the inputting section 140, and fetches and stores the character information clicked by the mouse or the like and including a telephone number, an address, a full name and so forth from the storage section 130 into the telephone directory address storage section 121.

The selection of a character train on the window display screen 112 may be character selection by a mouse or by character selection by a cursor. As a result of the operation described above, only by designating a telephone number displayed on the screen by means of the mouse, not only a telephone call can be originated, but character information including the full name of the other party to whom the telephone call is originated is automatically described into an address notebook. Consequently, the address notebook can be grown automatically even if it is not inputted later.

Referring back to FIG. 2, the circuit interface section 150 can be formed as an arbitrary circuit interface section such as a FAX modem board, a card, a software modem or an ISDN terminal adapter. Meanwhile, the inputting section 140 is not limited to a keyboard, but may be a touch panel or a mouse, or another program on the information terminal or the like which inputs an instruction and so forth similarly.

The telephone directory address storage section 121 may additionally store information of the inputting section 140, for example, an address, a name of a person or an attendance memorandum. In addition, storage into the telephone directory address storage section 121 may be storage into a location indicated by an item number based on information of the inputting section 140.

The display section 110 is not limited to a display section which is built in the apparatus, but may be a monitor connected to the information terminal 100. Also the inputting section 140 is not limited to an inputting section which is built in the apparatus, but may be an inputting section connected externally to the information terminal 100 or may be a keyboard, a 10-key pad, a track ball, a bar code reader, a character reading apparatus or the like.

Figure 4:
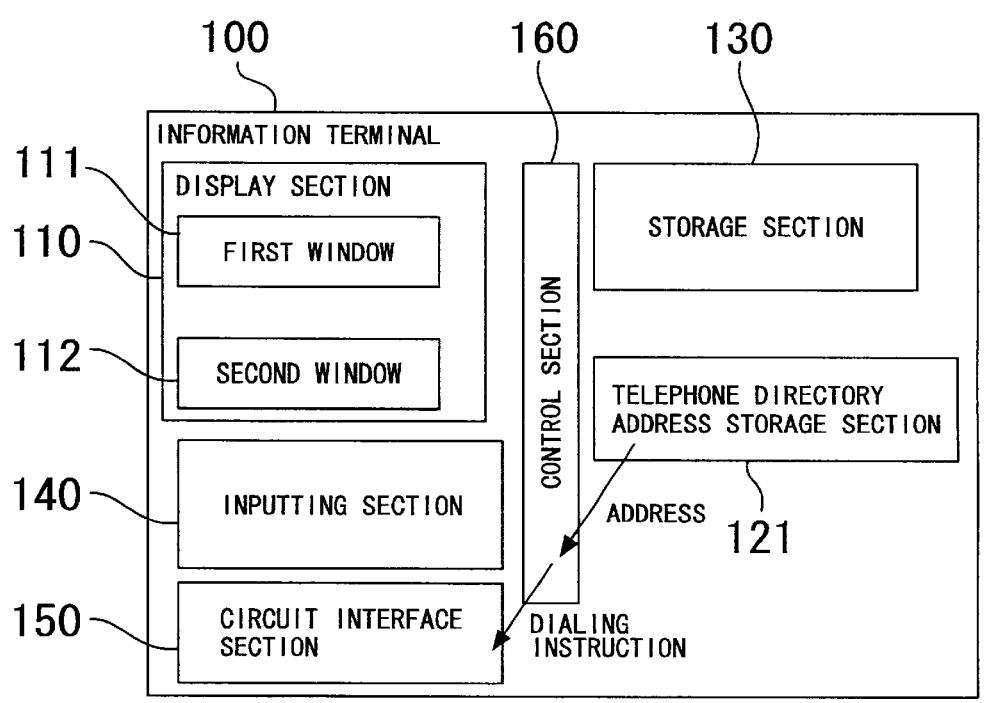
FIG. 4 is a block diagram showing a modification to the information of FIG. 1.

Referring now to FIG. 4, there is shown a modification to the information terminal described hereinabove with reference to FIG. 1. The modified information terminal is different from the information terminal of FIG. 1 in that the control section 160 is constructed so as to instruct the circuit interface section 150 to originate a telephone call by dialing based on an address stored in the telephone directory address storage section 121. In order to retrieve a desired telephone number from within the telephone directory address storage section 121, for example, stored contents of the telephone directory address storage section 121 are successively read out and displayed and then a pertaining one of the displayed contents is clicked by means of the mouse or the like, or telephone numbers are retrieved and read out from the telephone directory address storage section using a full name, an address or the like as a retrieval key and displayed, and then a pertaining one of the displayed telephone numbers is clicked by means of the mouse or the like.

It is to be noted that reading out from the telephone directory address storage section 121 is not necessarily performed by the control section 160, but may be performed by an application of the first window or the second window. For example, addresses stored in the telephone directory address storage section 121 are read out and displayed on the second window 112, and a character train selected from among the addresses is fetched into the first window 111 through the storage section 130, and then a telephone call origination instruction from the inputting section 140 is waited in the first window 111, whereafter a telephone number is dialed through the circuit interface section 150 in response to a telephone call origination instruction from the inputting section 140. Simultaneously, the telephone directory address storage section 121 may be updated with the character train selected on the second window 112.

Referring now FIG. 5, there is shown another modification to the information terminal described hereinabove with reference to FIG. 1. The modified information terminal is different from the information terminal of FIG. 1 in that it additionally includes an address comparison memory section 170. In particular, when a character train other than a numeral is included in a character train fetched as the telephone call origination information mentioned hereinabove from the second window 112, the character train is compared with characters representing an address such as No., City, Town, Village, County, Prefecture or State and some other predetermined characters stored in the address comparison memory section 170. If coincident characters are detected in the character train, then an address of the telephone directory address storage section 121 is designated so that the character train may be stored into an address column 122 of the telephone directory address storage section 121.

Figure 5:
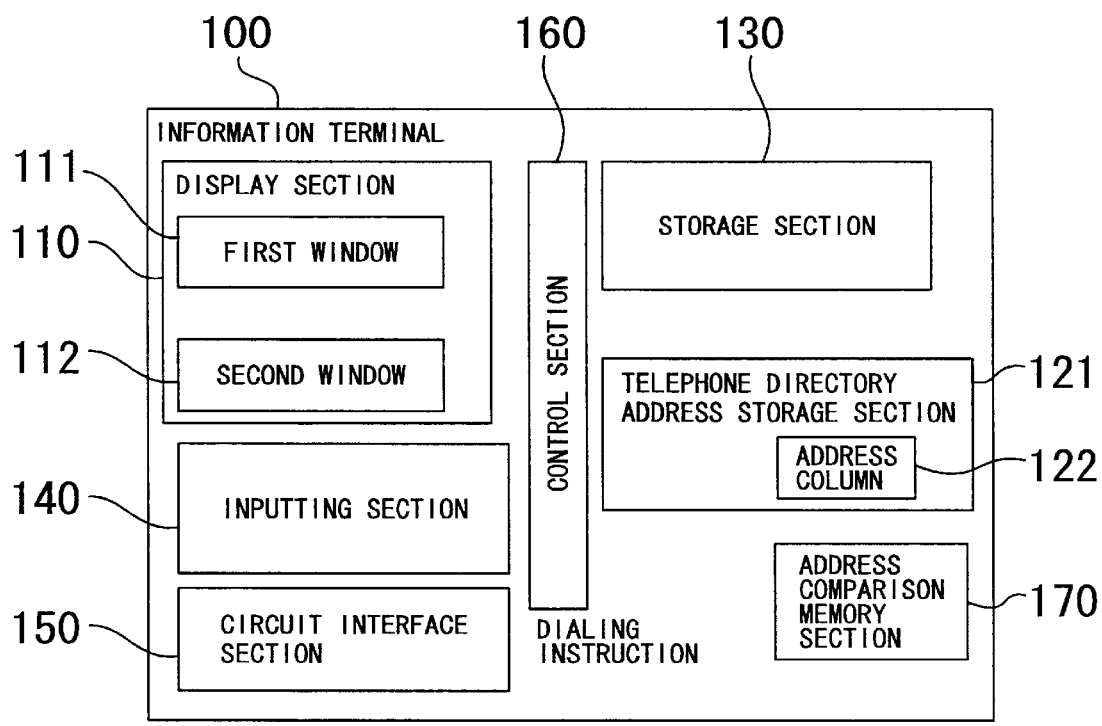
FIG. 5 is a block diagram showing another modification to the information terminal of FIG. 1.
Figure 6:
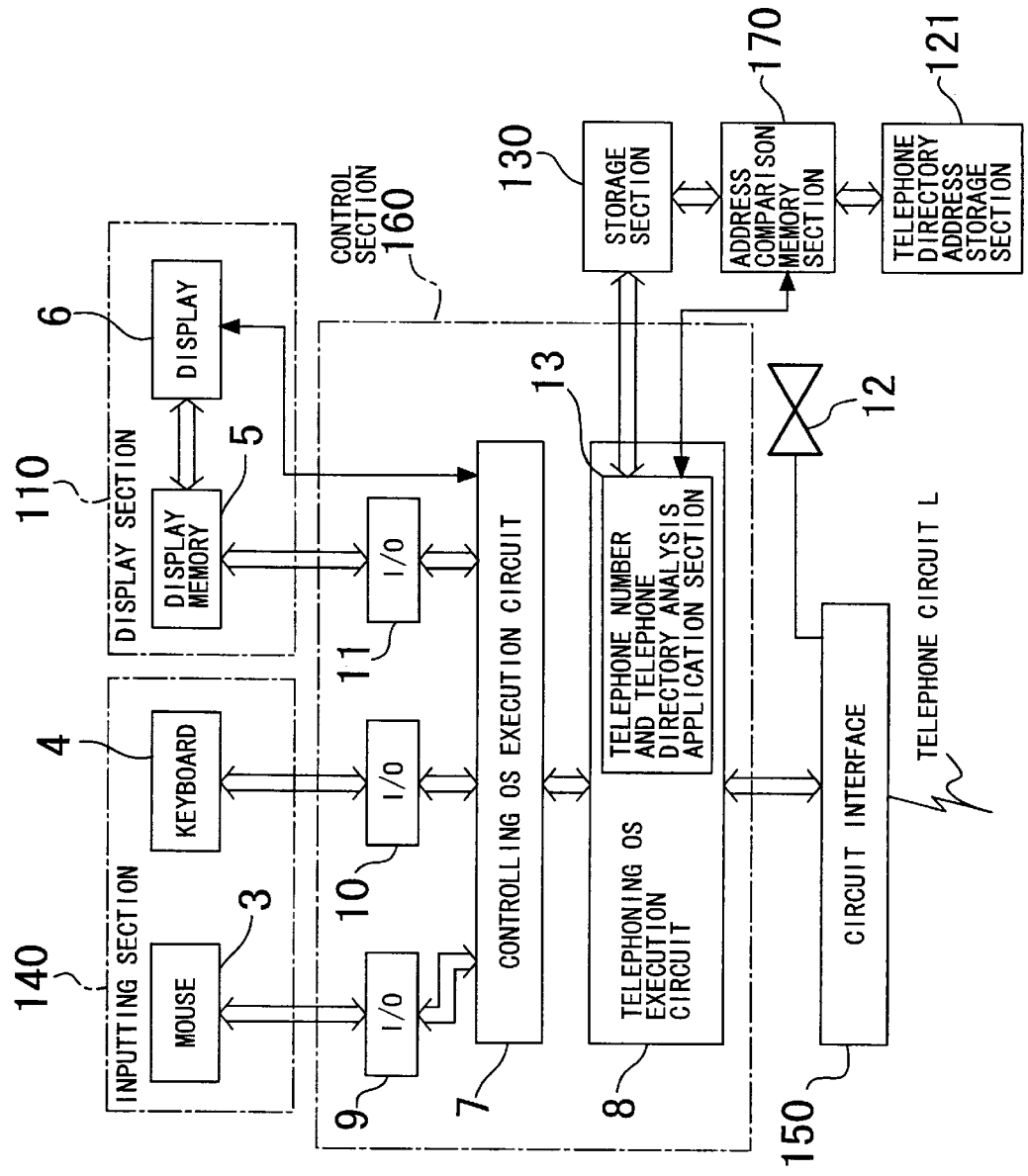
FIG. 6 is a block diagram showing connections among a control circuit, a telephone directory address storage section and peripheral circuits of the information terminal of FIG. 5.

Referring to FIG. 6 which shows connections among the control section 160, telephone directory address storage section 121 and associated circuits of the information terminal of FIG. 5, the telephone number and telephone directory analysis application section 13 of the telephoning OS execution circuit 8 of the control section 160 transmits and receives instructions and information to and from the address comparison memory section 170 and the telephone directory address storage section 121 through the storage section 130. The telephone number and telephone directory analysis application section 13 performs control of extracting a telephone number from within character information clicked by means of the mouse or the like from within the information stored in the common work area of the controlling OS execution circuit 7 and dialing through the circuit interface section 150 in response to a telephone call origination instruction from the inputting section 140 and control of storing the telephone number into a telephone number column of the telephone directory address storage section 121, comparing the character information clicked by means of the mouse or the like described above and including the telephone number, address, full name or the like with the characters registered in the address comparison memory section 170, and fetching and storing, when coincident characters are present, the character train into the address column 122 of the telephone directory address storage section 121.

Accordingly, when a call origination operation is performed, since the address of the destination of the telephone call is automatically stored into the address column 122 of the telephone directory address storage section 121, there is an advantage that the telephone directory is automatically grown only by repeating a call origination operation.

Figure 7:
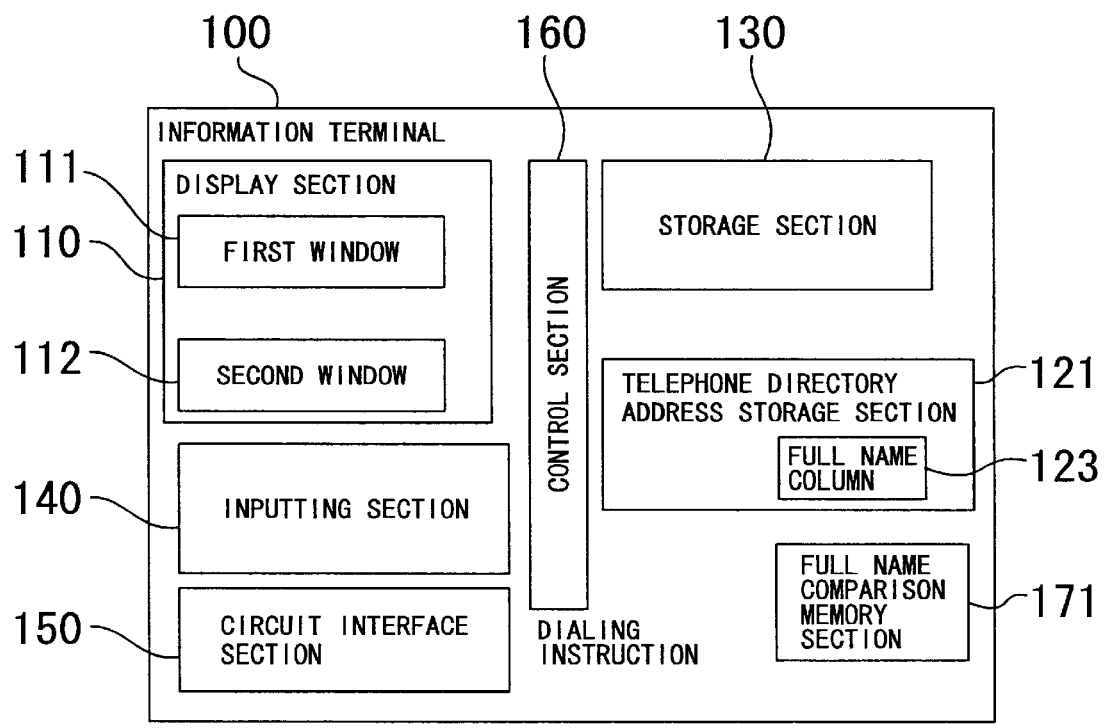
FIGS. 7 to 13 are block diagrams showing further modifications to the information terminal of FIG. 1.

Referring now to FIG. 7, there is shown a further modification to the information terminal described hereinabove with reference to FIG. 1. The modified information terminal is different from the information terminal of FIG. 1 in that it additionally includes a full name comparison memory section 171 and has a function of comparing, when a character train other than a numeral is included in a character train fetched as the call origination information described hereinabove from the second window 112, with predetermined characters such as full name, nick name and so forth registered in the name comparison memory section 171 and storing, when coincident characters are detected in the character train, a character train following the predetermined characters into a full name column 123 of the telephone directory address storage section 121. The control section 160 can be implemented with a construction similar to that of FIG. 5.

Accordingly, since, when a call origination operation is performed, the name of the destination of the telephone call is automatically stored into the full name column 123 of the telephone directory address storage section 121, there is an advantage that, only by repeating a call origination operation, the telephone directory is automatically grown not only with a telephone number but also with address information and full name information.

The information to be compared is not limited to characters, but may be a figure, a symbol or an instruction of a location in the second window.

Figure 8:
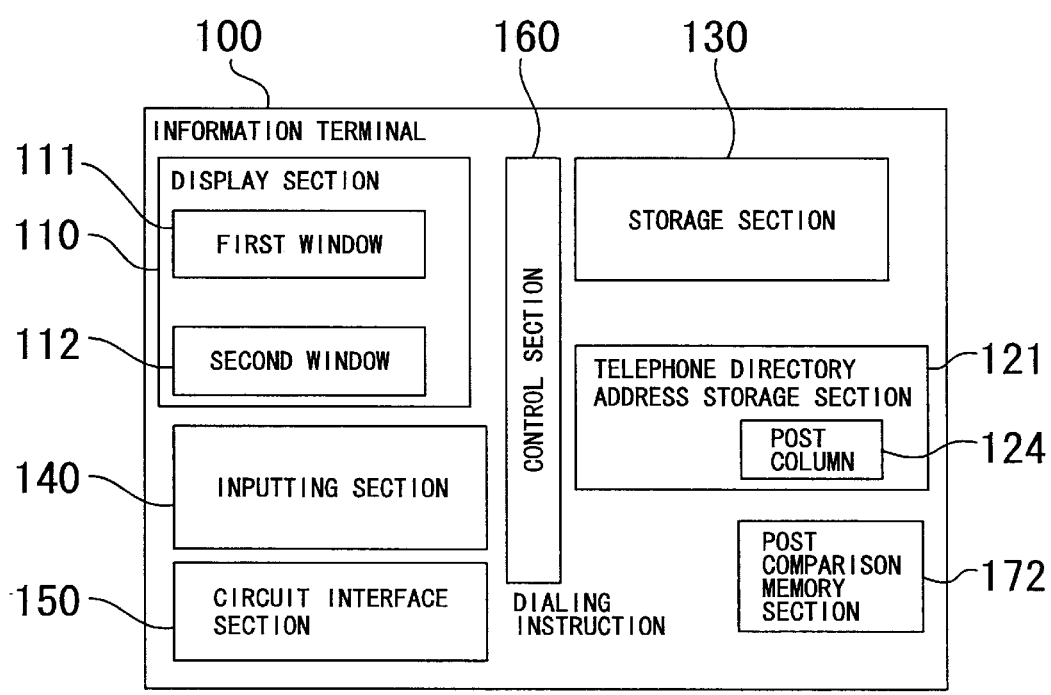

Referring now to FIG. 8, there is shown a still further modification to the information terminal described hereinabove with reference to FIG. 1. The modified information terminal is different from the information terminal of FIG. 1 in that it additionally includes a post comparison memory section 172, and has a function of comparing, when a character train other than a numeral is included in a character train fetched as the call origination information described above from the second screen 112, the character train with predetermined characters such as head of department, chief of section, person in charge and so forth registered in the post comparison memory section 172 and storing, when coincident characters are detected in the character train, a character train preceding the character train into a post column 124 of the telephone directory address storage section 121.

Accordingly, since, when a call origination operation is performed, the post of the destination of the telephone call is stored automatically into the post column 124 of the telephone directory address storage section 121, there is an advantage that, only by repeating a call origination operation, the telephone directory is automatically grown not only with a telephone number but also with post information.

Figure 9:
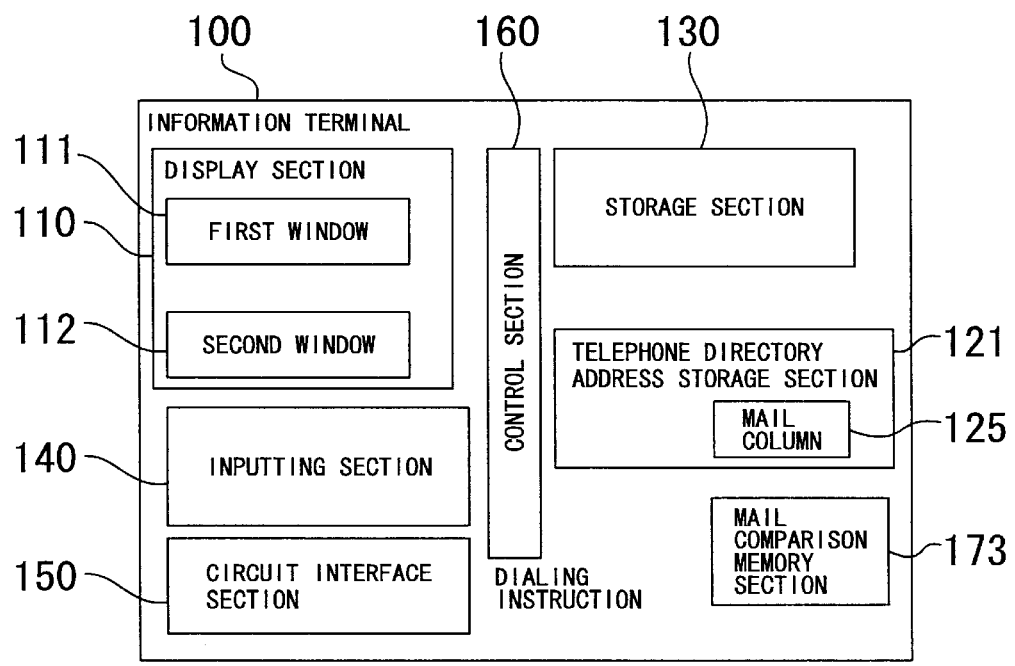

Referring now to FIG. 9, there is shown a yet further modification to the information terminal described hereinabove with reference to FIG. 1. The modified information terminal is different from the information terminal of FIG. 1 in that it additionally includes a mail comparison memory section 173, and has a function of comparing, when a character train other than a numeral is included in a character train fetched as the call origination information from the second window 112, the character train with predetermined characters such as @, E-Mail, mail text and so forth registered in the mail comparison memory section 173 and storing, if coincident characters are detected in the character train, the character train into a mail column 125 of the telephone directory address storage section 121.

Accordingly, since, if a call origination operation is performed, a mail of the destination of the telephone call is automatically stored into the mail column 125 of the telephone directory address storage section 121, there is an advantage that the telephone directory is automatically grown not only with a telephone number but also with mail information.

Figure 10:
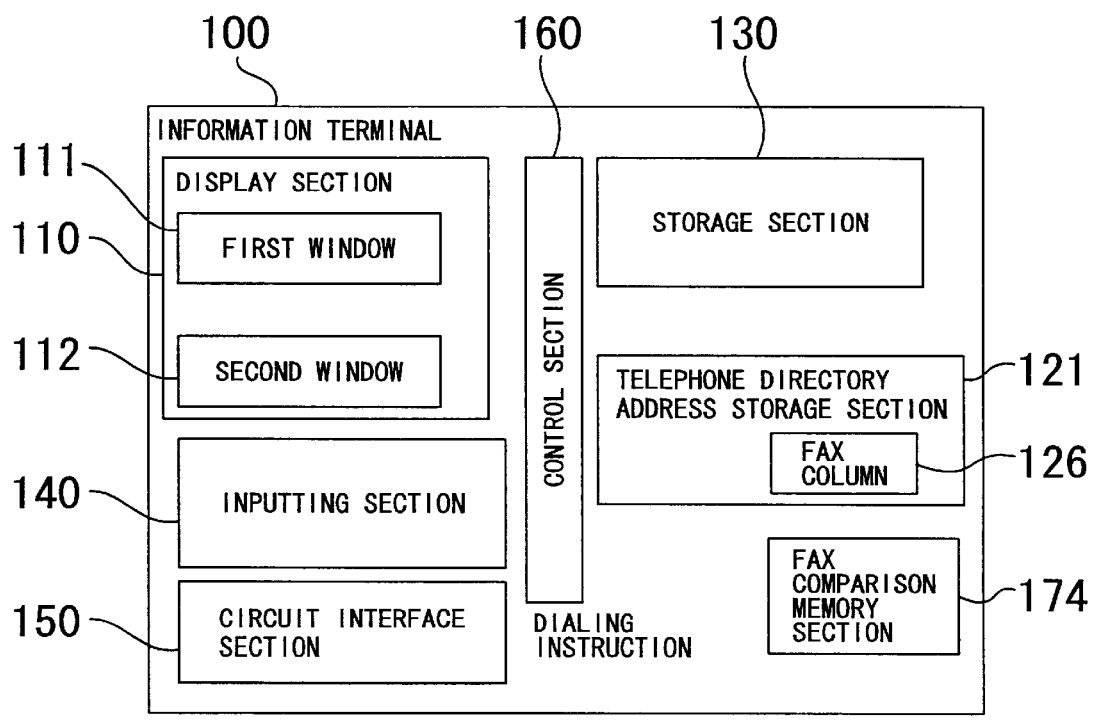

Referring now to FIG. 10, there is shown a yet further modification to the information terminal described hereinabove with reference to FIG. 1. The modified information terminal is different from the information terminal of FIG. 1 in that it additionally includes a FAX comparison memory section 174, and has a function of comparing, when a character train other than a numeral is included in a character train fetched as the call origination information from the second window 112, the character train with predetermined characters determined in advance such as FAX, facsimile and so forth registered in the FAX comparison memory section 174 and storing, when coincident characters are detected in the character train, a character train preceding the same into a FAX column 126 of the telephone directory address storage section 121.

Figure 11:
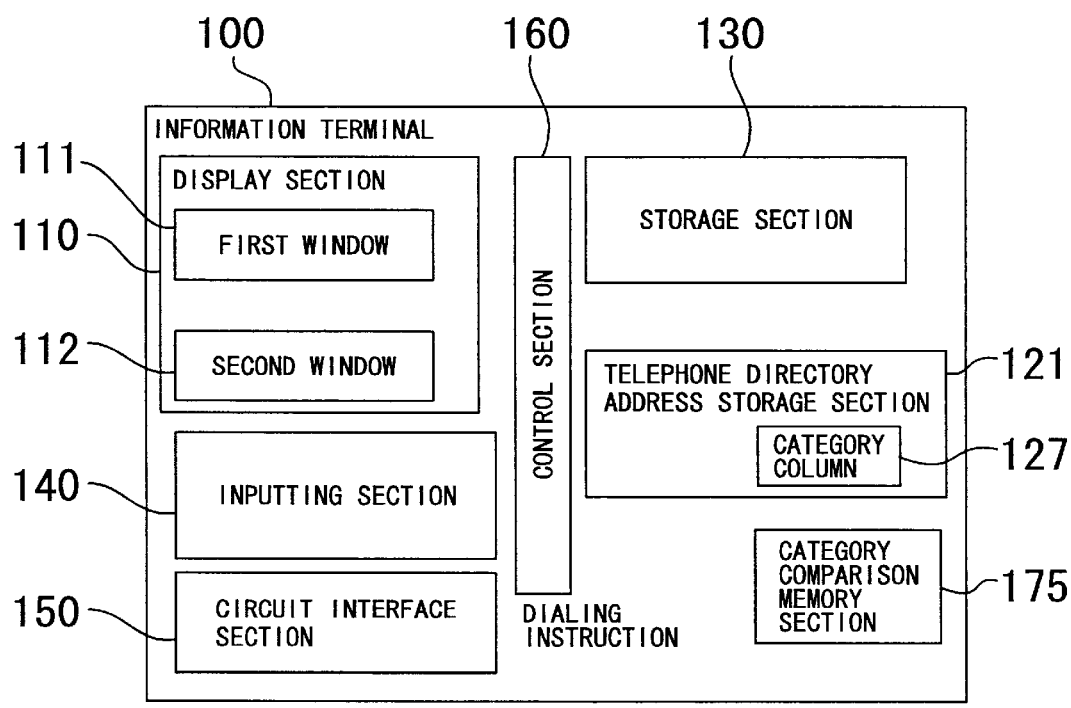

Accordingly, since, if a call origination operation is performed, a mail of the destination of the telephone call is automatically stored into the FAX column 126 of the telephone directory address storage section 121, there is an advantage that, only by repeating a call origination operation, the telephone directory is automatically grown not only with a telephone number but also with FAX information. Referring now to FIG. 11, there is shown a yet further modification to the information terminal described hereinabove with reference to FIG. 1. The modified information terminal is different from the information terminal of FIG. 1 in that it additionally includes a category comparison memory section 175, and has a function of comparing, when a character train other than a numeral is included in a character train fetched as the call origination information from the second window 112, the character train with predetermined characters determined in advance such as division, section, intra-company, headquarters and so forth registered in the category comparison memory section 175 and storing, when coincident characters are detected in the character train, the character train into a category column 127 of the telephone directory address storage section 121.

Accordingly, since, if a call origination operation is performed, the category of the destination of the telephone call is automatically stored into the category column 127 of the telephone directory address storage section 121, there is an advantage that, only by repeating a call origination operation, the telephone directory is automatically grown not only with a telephone number but also with category information.

Figure 12:
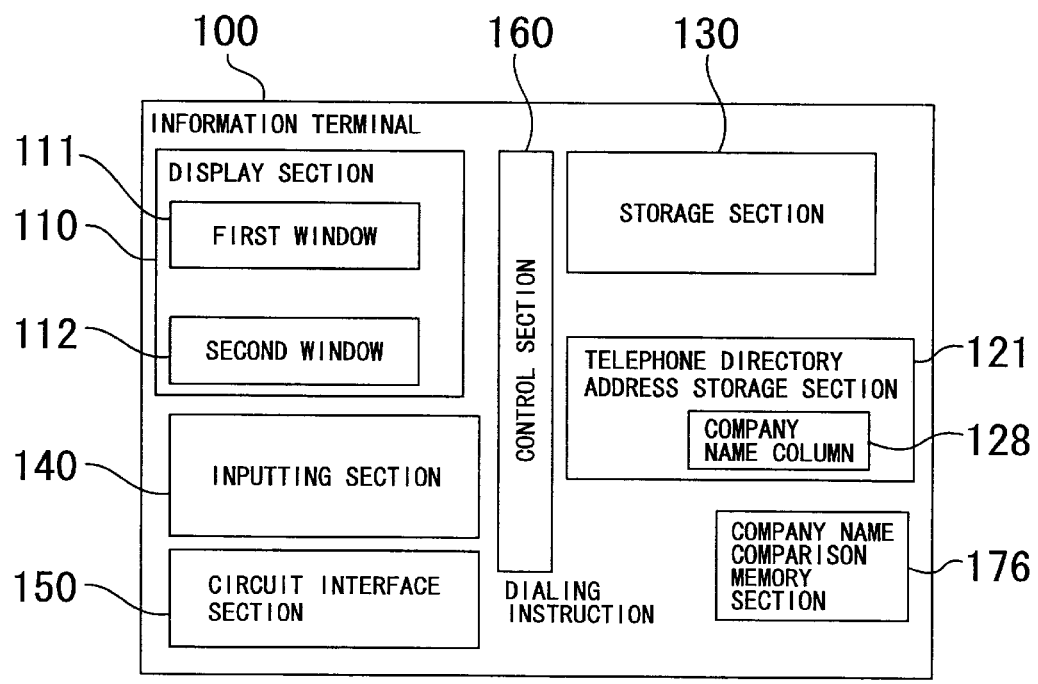

Referring now to FIG. 12, there is shown a yet further modification to the information terminal described hereinabove with reference to FIG. 1. The modified information terminal is different from the information terminal of FIG. 1 in that it additionally includes a company name comparison memory section 176, and has means for comparing, when a character train other than a numeral is included in a character train fetched as the call origination information from the second window 112, the character train with predetermined characters determined in advance such as company, ministry, foundation, agency, office and so forth registered in the company name comparison memory section 176 and storing, when coincident characters are detected in the character train, a character train preceding the same into a company name column 128 of the telephone directory address storage section 121.

Accordingly, since, if a call origination operation is performed, the company name of the destination of the telephone call is automatically stored into the company name column 128 of the telephone directory address storage section 121, there is an advantage that, only by repeating a call origination operation, the telephone directory is automatically grown not only with a telephone number but also with company name information.

Figure 13:
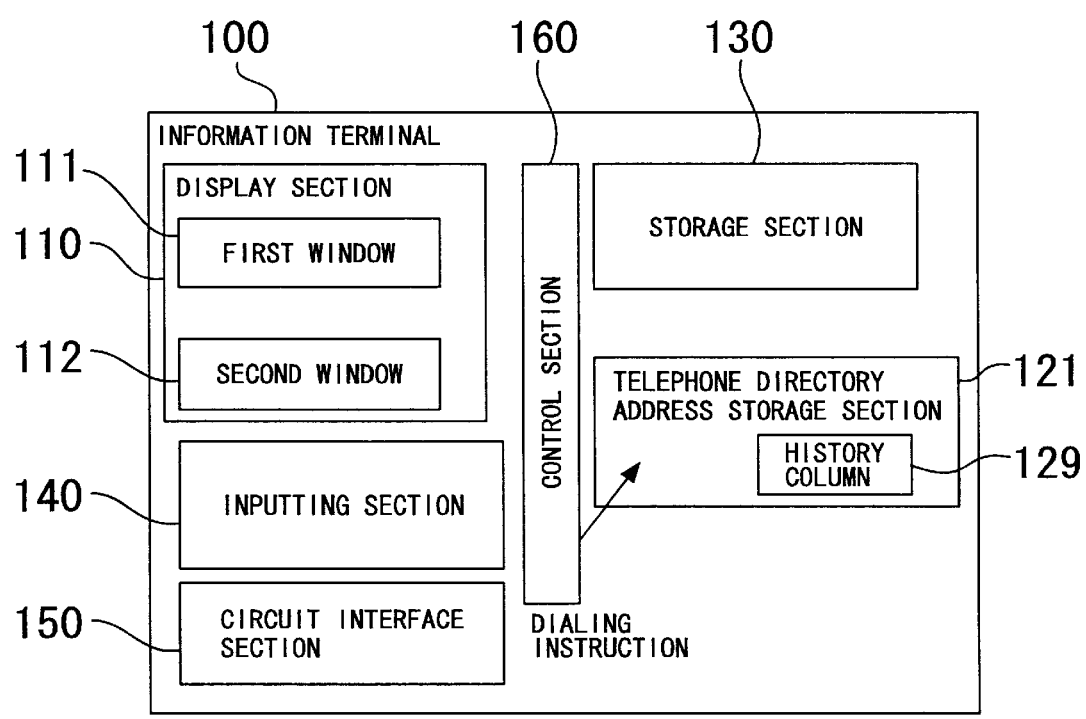

Referring now to FIG. 13, there is shown a yet further modification to the information terminal described hereinabove with reference to FIG. 1. The modified information terminal is different from the information terminal of FIG. 1 in that it has a function of for storing, when a call origination operation is performed, a call origination history from the control section 160 into a history column 129 of the telephone directory address storage section 121, and if a call origination operation is repeated, then a consumer corresponding history remains in the telephone directory.

As regards the call origination history described above, the information terminal may be constructed alternatively such that it has a function of storing, when characters are inputted from the inputting section 140, the characters into the contents of the history column 129 of the telephone directory address storage section 121 so that a consumer corresponding history is left in the telephone directory only by repeating a call origination operation.

It is to be noted that, while the present invention is described above principally in connection with call origination, it is naturally possible to store a caller ID or an additional dial or some other telephone number acquired upon call termination or upon holding into the telephone directory address storage section 121.

Figure 14:
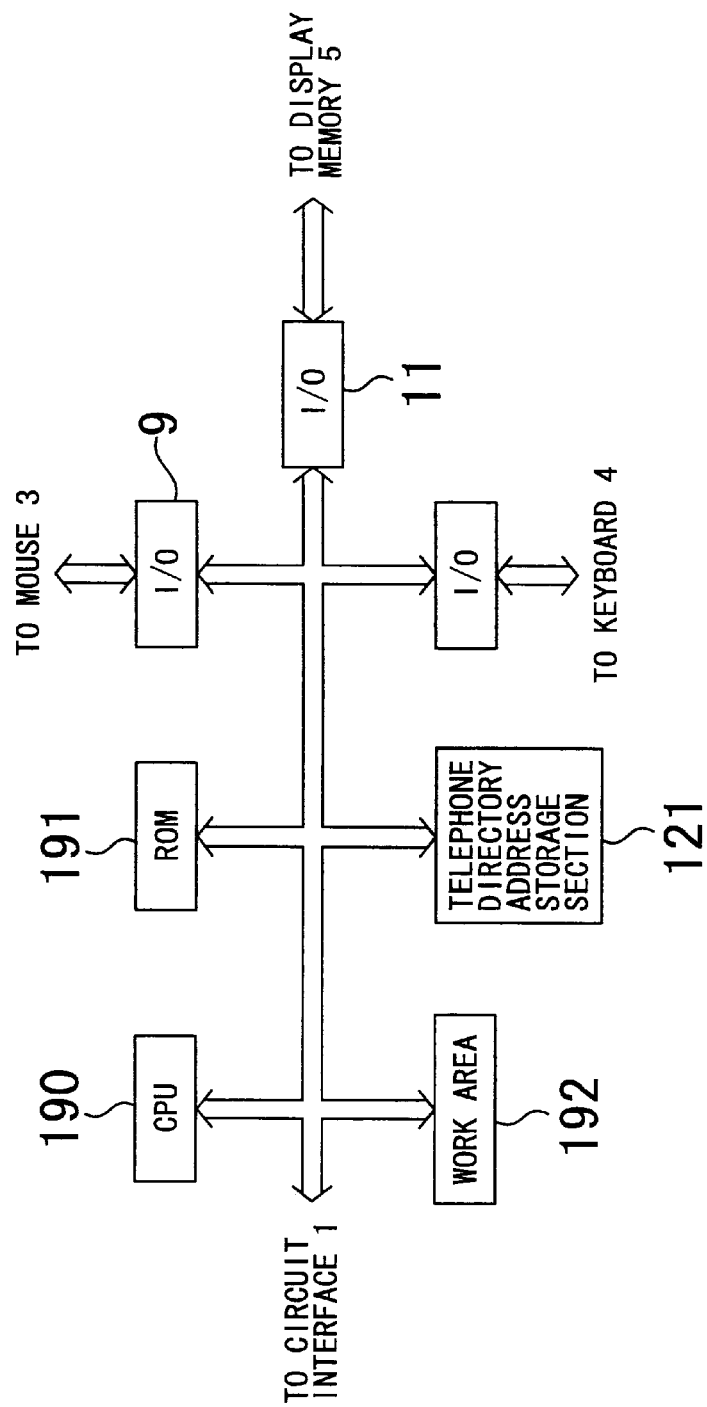
FIG. 14 is a block diagram showing another information terminal to which the present invention is applied.
Figure 15:
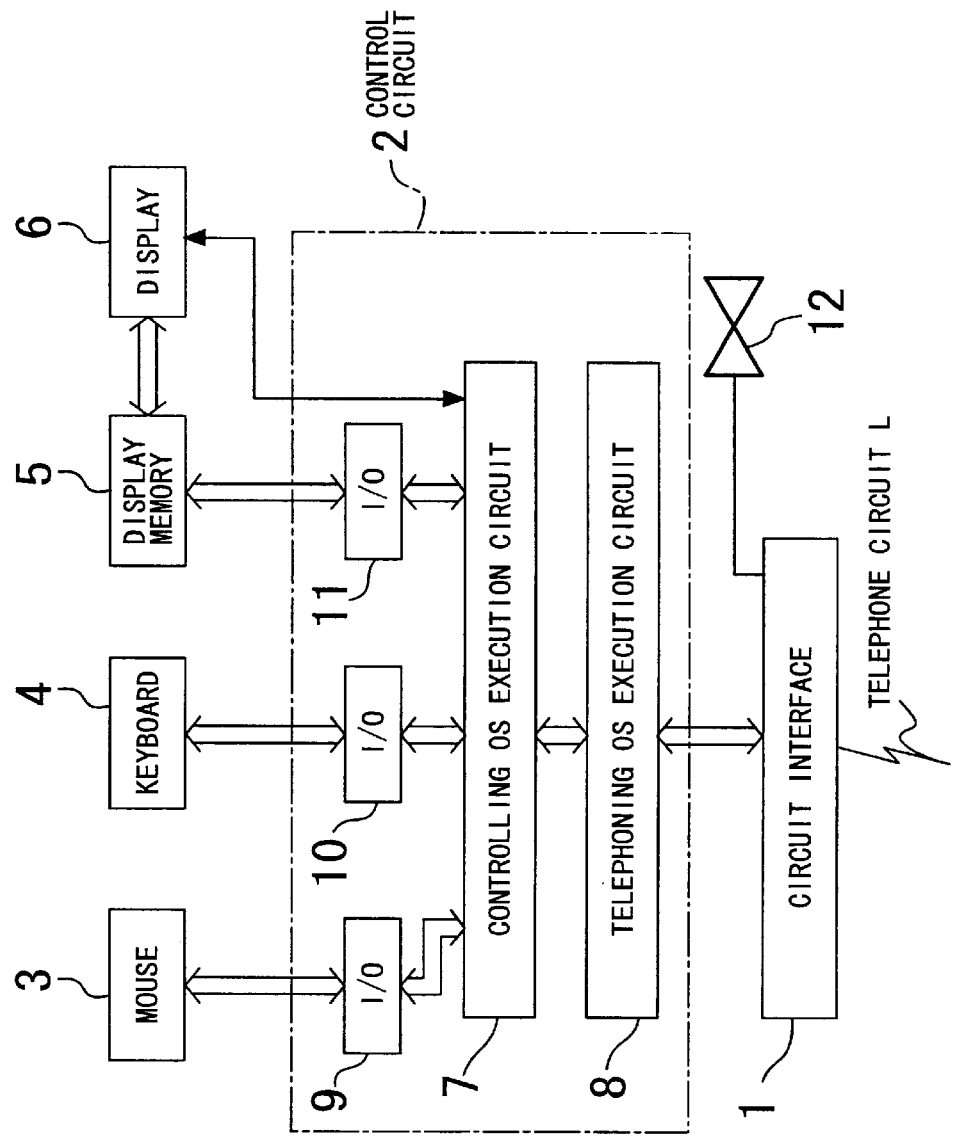
FIG. 15 is a block diagram showing a conventional information terminal; and example.
Figure 16:
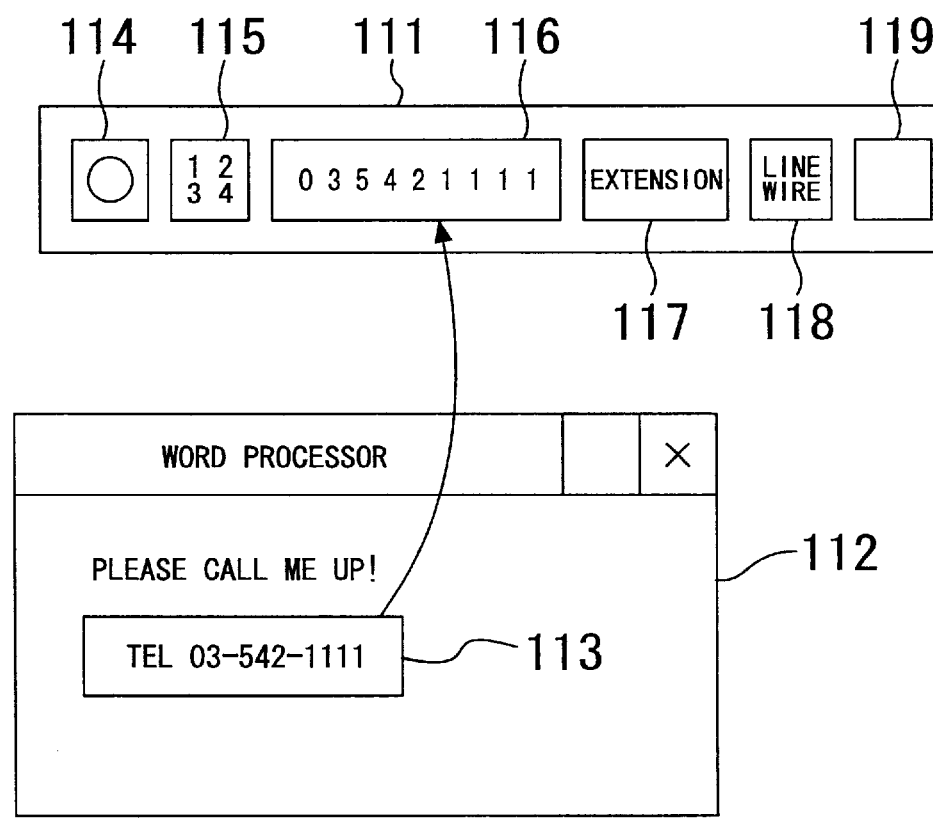
FIG. 16 is a diagrammatic view illustrating operation of the conventional information terminal of FIG. 15.

FIG. 14 is a block diagram showing another information terminal to which the present invention is applied. Referring to FIG. 14, the information terminal shown includes a CPU 190 in the form of a computer which controls the entire information terminal based on programs stored in a ROM 191, and a work area 192 serving a storage area for instructions and data used during execution of the programs.

The programs stored in the ROM 191 are a controlling OS and a telephoning OS read out by the CPU 190. Operation of the controlling OS corresponds to the process executed by the controlling OS execution circuit 7 described hereinabove with reference to FIG. 2, and operation of the telephoning OS corresponds to a process executed by the application sections including the telephone number and telephone directory analysis application section 13 of the telephoning OS execution circuit 8 described hereinabove with reference to FIG. 2. The program of the telephoning OS is incorporated into an execution program of the controlling OS by installation.

In operation, referring also to FIG. 3, when the controlling OS is executed by the CPU 190, character information 113 is extracted by a range designation by a reverse display or a framework from the second window 112 displayed on the display screen through the display memory 5. Consequently, the character information in the range designation is stored into the common work area of the CPU 190. Thereafter, when an operation such as clicking by the mouse or the like is performed, the CPU 190 extracts a telephone number from within the character information by control similar to that of the telephone number and telephone directory analysis application section 13 of the telephoning OS execution circuit 8 described hereinabove with reference to FIG. 2 and outputs the telephone number to a display memory 5 (not shown in FIG. 14). Consequently, the extracted telephone number is displayed on the display portion 116 of the telephone call originating window (first window) 111.

The CPU 190 controls, when a call origination instruction is received, a circuit interface 1 (not shown in FIG. 14) to originate a telephone call to a telephone circuit L (not shown in FIG. 14) based on the telephone number displayed in the first window 111. Simultaneously, the CPU 190 transfers and stores the character information in the designated range in the second window 112 to and into the telephone directory address storage section 121. The storing procedure may have a suitable form such as one of those in the information terminals described hereinabove with reference to FIGS. 1 to 13 or a combination of them.

While preferred embodiments of the present invention have been described using specific terms, such description is for illustrative purposes only, and it is to be understood that changes and variations may be made without departing from the spirit or scope of the following claims.

What is claimed is:

1. A telephone directory address storing method for an information terminal which has an operating system operable to display a plurality of window screens on a display unit and which is provided with a telephone function, the method comprising:

displaying at least first and second windows on the display simultaneously, wherein the first window is operable to display a selected telephone number for dialing and the second window is operable to display character information from which the selected telephone number is selected;

selecting the character information on the second window and storing the selected character information;

extracting a telephone number from within the selected and stored character information;

originating a telephone call to a telephone circuit based on the extracted telephone number, wherein the telephone call is originated from the first window; and transferring and storing all of the selected character information to and into a telephone directory address storage section.

2. A telephone directory address storing method as claimed in claim 1, wherein the character information stored in said telephone directory address storage section is read out, and a telephone number is extracted from within the read out character information, and a telephone call is originated to said telephone circuit based on the extracted telephone number.

3. A telephone directory address storing method as claimed in claim 1, wherein said telephone directory address storage section is partitioned into a plurality of item columns, and character information corresponding to each of the items is extracted from the selected character information and transferred to and stored in a respective item column.

4. A telephone directory address storing method as claimed in claim 1, wherein said telephone directory address storage section has a history column, and history information is stored into said history column of a pertaining telephone number when a telephone call origination operation is performed or in response to inputting of characters from an operation section.

5. A telephone directory address storing method by an information terminal which has an operating system by which a plurality of window screens can be displayed on a display unit and is provided with a telephone function, comprising:

displaying a first window for controlling origination of a telephone call;

selecting character information on a second window initiated by said operating system and displayed separately from and simultaneously with said first window and storing the selected character information;

extracting a telephone number from within the stored character information;

displaying the telephone number on said first window;

originating a telephone call to a telephone circuit based on the telephone number displayed on said first window; and transferring and storing all of the selected character information to and into a telephone directory address storage section.

6. A telephone directory address storing method as claimed in claim 5, wherein character information selected from within reception information displayed on said second window is stored, and the stored character information is transferred to and stored into said telephone directory address storage section.

7. A telephone directory address storing method as claimed in claim 5, wherein the character information stored in said telephone directory address storage section is read out, and a telephone number is extracted from within the read out character information, and a telephone call is originated to said telephone circuit based on the extracted telephone number.

8. A telephone directory address storing method as claimed in claim 5, wherein said telephone directory address storage section is sectioned into a plurality of item columns, and character information corresponding to each of the items is extracted from the selected character information and transferred to and stored into a corresponding item column.

9. A telephone directory address storing method as claimed in claim 5, wherein said telephone directory address storage section has a history column, and history information is stored into said history column of a pertaining telephone number when a telephone call origination operation is performed or in response to inputting of characters from an operation section.

10. An information terminal having a telephone function and having an operating system which allows a plurality of window screens to be displayed on a display unit, the information terminal comprising:

character information selection means for selecting character information displayed on a second window screen initiated by said operating system;

storage means for storing the character information selected by said character information selection means;

means for extracting a telephone number from within the character information stored in said storage means;

means for outputting the telephone number extracted by said means for extracting a telephone number to a first window in order to originate a telephone call to a telephone circuit, wherein the first and second windows are displayed on the display unit simultaneously; and telephone directory address storage means for storing the character information stored in said storage means as address information.

11. An information terminal having a telephone function as claimed in claim 10, further comprising means for reading out the character information stored in said telephone directory address storage means, extracting a telephone number from within the read out character information, and originating a telephone call to a circuit based on the extracted telephone number.

12. An information terminal having a telephone function as claimed in claim 10, wherein said telephone directory address storage means is sectioned into more than one item column, and includes item comparison memory means for extracting character information corresponding to each of the items corresponding to the item columns from within the selected character information and transferring and storing the character information to and into the pertaining item column.

13. An information terminal having a telephone function as claimed in claim 11, wherein said item comparison memory means stores characters relating to the items, and compares, when a character train other than a numeral is included in the character information selected by said character information selection means, the character information with the characters stored in said item comparison memory means and stores, when coincident characters are detected in the character train, the character train into the pertaining item column of said telephone directory address storage means.

14. An information terminal having a telephone function as claimed in claim 13, wherein said item comparison memory means includes an address comparison memory section and compares, when a character train other than a numeral is included in the character train fetched from said second window, the character train with predetermined characters registered in said address comparison memory section, and then stores, when coincident characters are detected in the character train, the character train into an address column of said telephone directory address storage section.

15. An information terminal having a telephone function as claimed in claim 13, wherein said item comparison memory means includes a name comparison memory section and compares, when a character train other than a numeral is included in the character train fetched from said second window, the character train with predetermined characters registered in said name comparison memory section, and then stores, when coincident characters are detected in the character train, the character train into a name column of said telephone directory address storage section.

16. An information terminal having a telephone function as claimed in claim 13, wherein said item comparison memory means includes a post comparison memory section and compares, when a character train other than a numeral is included in the character train fetched from said second window, the character train with predetermined characters registered in said post comparison memory section, and then stores, when coincident characters are detected in the character train, the character train into a post column of said telephone directory address storage section.

17. An information terminal having a telephone function as claimed in claim 13, wherein said item comparison memory means includes a mail comparison memory section and compares, when a character train other than a numeral is included in the character train fetched from said second window, the character train with predetermined characters registered in said mail comparison memory section, and then stores, when coincident characters are detected in the character train, the character train into a mail column of said telephone directory address storage section.

18. An information terminal having a telephone function as claimed in claim 13, wherein said item comparison memory means includes a FAX comparison memory section and compares, when a character train other than a numeral is included in the character train fetched from said second window, the character train with predetermined characters registered in said FAX comparison memory section, and then stores, when coincident characters are detected in the character train, the character train into a FAX column of said telephone directory address storage section.

19. An information terminal having a telephone function as claimed in claim 13, wherein said item comparison memory means includes a division comparison memory section and compares, when a character train other than a numeral is included in the character train fetched from said second window, the character train with predetermined characters registered in said division comparison memory section, and then stores, when coincident characters are detected in the character train, the character train into a division column of said telephone directory address storage section.

20. An information terminal having a telephone function as claimed in claim 13, wherein said item comparison memory means includes a company name comparison memory section and compares, when a character train other than a numeral is included in the character train fetched from said second window, the character train with predetermined characters registered in said company name comparison memory section, and then stores, when coincident characters are detected in the character train, the character train into a company name column of said telephone directory address storage section.

21. An information terminal having a telephone function as claimed in claim 10, further comprising means for storing, when a telephone call to said telephone circuit is originated, a call origination history into a history column of said telephone directory address storage section.

22. An information terminal having a telephone function as claimed in claim 10, further comprising means for inputting characters from an operation section to store the call origination history into a history column of said telephone directory address storage section.

23. An information terminal having a telephone function and having an operating system which allows a plurality of window screens to be displayed on a display unit, comprising:
means for displaying a first window for controlling origination of a telephone call;
means initiated by said operating system for displaying a second window on the display unit concurrently with the first window;
character information selection means for selecting character information displayed on said second window screen;
storage means for storing the character information selected by said character information selection means;
means for extracting a telephone number from within the character information stored in said storage means and displaying the telephone number on said first window;
means for outputting the telephone number displayed on said first window in order to originate a telephone call to a telephone circuit; and
telephone directory address storage means for storing the character information stored in said storage means as address information.

24. An information terminal having a telephone function as claimed in claim 23, further comprising:
means for displaying reception information on said second window;
character information selection means for selecting character information from within the reception information displayed on said second window screen;
storage means for storing the character information selected by said character information selection means; and
telephone directory address storage means for storing the character information stored in said storage means as address information.

25. An information terminal having a telephone function as claimed in claim 23, further comprising means for reading out the character information stored in said telephone directory address storage means, extracting a telephone number from within the read out character information, and originating a telephone call to a circuit based on the extracted telephone number.

26. An information terminal having a telephone function as claimed in claim 23, wherein said telephone directory address storage means is sectioned into more than one item column, and includes item comparison memory means for extracting character information corresponding to each of the items from within the selected character information and transferring and storing the character information to and into the pertaining item column.

27. An information terminal having a telephone function as claimed in claim 26, wherein said item comparison memory means stores characters relating to the items, and compares, when a character train other than a numeral is included in the character information selected by said character information selection means, the character information with the characters stored in said item comparison memory means and stores, when coincident characters are detected in the character train, the character train into the pertaining item column of said telephone directory address storage means.

28. An information terminal having a telephone function as claimed in claim 27, wherein said item comparison memory means includes an address comparison memory section and compares, when a character train other than a numeral is included in the character train fetched from said second window, the character train with predetermined characters registered in said address comparison memory section, and then stores, when coincident characters are detected in the character train, the character train into an address column of said telephone directory address storage section.

29. An information terminal having a telephone function as claimed in claim 27, wherein said item comparison memory means includes a name comparison memory section and compares, when a character train other than a numeral is included in the character train fetched from said second window, the character train with predetermined characters registered in said name comparison memory section, and then stores, when coincident characters are detected in the character train, the character train into a name column of said telephone directory address storage section.

30. An information terminal having a telephone function as claimed in claim 27, wherein said item comparison memory means includes a post comparison memory section and compares, when a character train other than a numeral is included in the character train fetched from said second window, the character train with predetermined characters registered in said post comparison memory section, and then stores, when coincident characters are detected in the character train, the character train into a post column of said telephone directory address storage section.

31. An information terminal having a telephone function as claimed in claim 27, wherein said item comparison memory means includes a mail comparison memory section and compares, when a character train other than a numeral is included in the character train fetched from said second window, the character train with predetermined characters registered in said mail comparison memory section, and then stores, when coincident characters are detected in the character train, the character train into a mail column of said telephone directory address storage section.

32. An information terminal having a telephone function as claimed in claim 27, wherein said item comparison memory means includes a FAX comparison memory section and compares, when a character train other than a numeral is included in the character train fetched from said second window, the character train with predetermined characters registered in said FAX comparison memory section, and then stores, when coincident characters are detected in the character train, the character train into a FAX column of said telephone directory address storage section.

33. An information terminal having a telephone function as claimed in claim 27, wherein said item comparison memory means includes a division comparison memory section and compares, when a character train other than a numeral is included in the character train fetched from said second window, the character train with predetermined characters registered in said division comparison memory section, and then stores, when coincident characters are detected in the character train, the character train into a division column of said telephone directory address storage section.

34. An information terminal having a telephone function as claimed in claim 27, wherein said item comparison memory means includes a company name comparison memory section and compares, when a character train other than a numeral is included in the character train fetched from said second window, the character train with predetermined characters registered in said company name comparison memory section, and then stores, when coincident characters are detected in the character train, the character train into a company name column of said telephone directory address storage section.

35. An information terminal having a telephone function as claimed in claim 23, further comprising means for storing, when a telephone call to said telephone circuit is originated, a call origination history into a history column of said telephone directory address storage section.

36. An information terminal having a telephone function as claimed in claim 23, further comprising means for inputting characters from an operation section to store the call origination history into a history column of said telephone directory address storage section.

37. An information terminal having a telephone function as claimed in claim 24, wherein said telephone directory address storage means is sectioned into more than one item column, and includes item comparison memory means for extracting character information corresponding to each of the items from within the selected character information and transferring and storing the character information to and into the pertaining item column.

38. An information terminal having a telephone function as claimed in claim 37, wherein said item comparison memory means stores characters relating to the items, and compares, when a character train other than a numeral is included in the character information selected by said character information selection means, the character information with the characters stored in said item comparison memory means and stores, when coincident characters are detected in the character train, the character train into the pertaining item column of said telephone directory address storage means.

39. An information terminal having a telephone function as claimed in claim 38, wherein said item comparison memory means includes an address comparison memory section and compares, when a character train other than a numeral is included in the character train fetched from said second window, the character train with predetermined characters registered in said address comparison memory section, and then stores, when coincident characters are detected in the character train, the character train into an address column of said telephone directory address storage section.

40. An information terminal having a telephone function as claimed in claim 38, wherein said item comparison memory means includes a name comparison memory section and compares, when a character train other than a numeral is included in the character train fetched from said second window, the character train with predetermined characters registered in said name comparison memory section, and then stores, when coincident characters are detected in the character train, the character train into a name column of said telephone directory address storage section.

41. An information terminal having a telephone function as claimed in claim 38, wherein said item comparison memory means includes a post comparison memory section and compares, when a character train other than a numeral is included in the character train fetched from said second window, the character train with predetermined characters registered in said post comparison memory section, and then stores, when coincident characters are detected in the character train, the character train into a post column of said telephone directory address storage section.

42. An information terminal having a telephone function as claimed in claim 38, wherein said item comparison memory means includes a mail comparison memory section and compares, when a character train other than a numeral is included in the character train fetched from said second window, the character train with predetermined characters registered in said mail comparison memory section, and then stores, when coincident characters are detected in the character train, the character train into a mail column of said telephone directory address storage section.

43. An information terminal having a telephone function as claimed in claim 38, wherein said item comparison memory means includes a FAX comparison memory section and compares, when a character train other than a numeral is included in the character train fetched from said second window, the character train with predetermined characters registered in said FAX comparison memory section, and then stores, when coincident characters are detected in the character train, the character train into a FAX column of said telephone directory address storage section.

44. An information terminal having a telephone function as claimed in claim 38, wherein said item comparison memory means includes a division comparison memory section and compares, when a character train other than a numeral is included in the character train fetched from said second window, the character train with predetermined characters registered in said division comparison memory section, and then stores, when coincident characters are detected in the character train, the character train into a division column of said telephone directory address storage section.

45. An information terminal having a telephone function as claimed in claim 38, wherein said item comparison memory means includes a company name comparison memory section and compares, when a character train other than a numeral is included in the character train fetched from said second window, the character train with predetermined characters registered in said company name comparison memory section, and then stores, when coincident characters are detected in the character train, the character train into a company name column of said telephone directory address storage section.

46. A storage medium on which a program is stored for causing a computer to execute the steps of:

displaying a first window for controlling origination of a telephone call;

selecting character information on a second window different from said first window and storing the selected character information, wherein said second window is displayed simultaneous with said first window;

extracting a telephone number from within the stored character information and displaying the telephone number on said first window;

originating a telephone call to a telephone circuit based on the telephone number displayed on said first window; and transferring and storing the selected character information to and into a telephone directory address storage section.

\* \* \* \* \*